April 3, 1951  H. W. HAPMAN  2,547,462
CONVEYER VIBRATOR
Filed Jan. 2, 1948  2 Sheets-Sheet 1
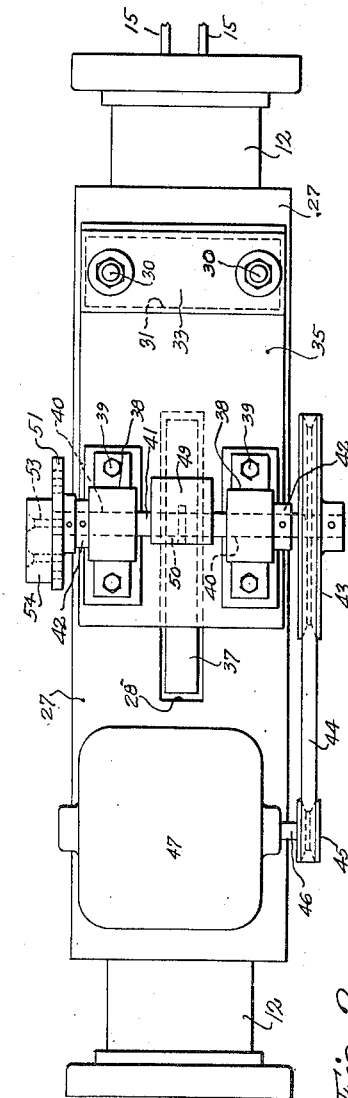
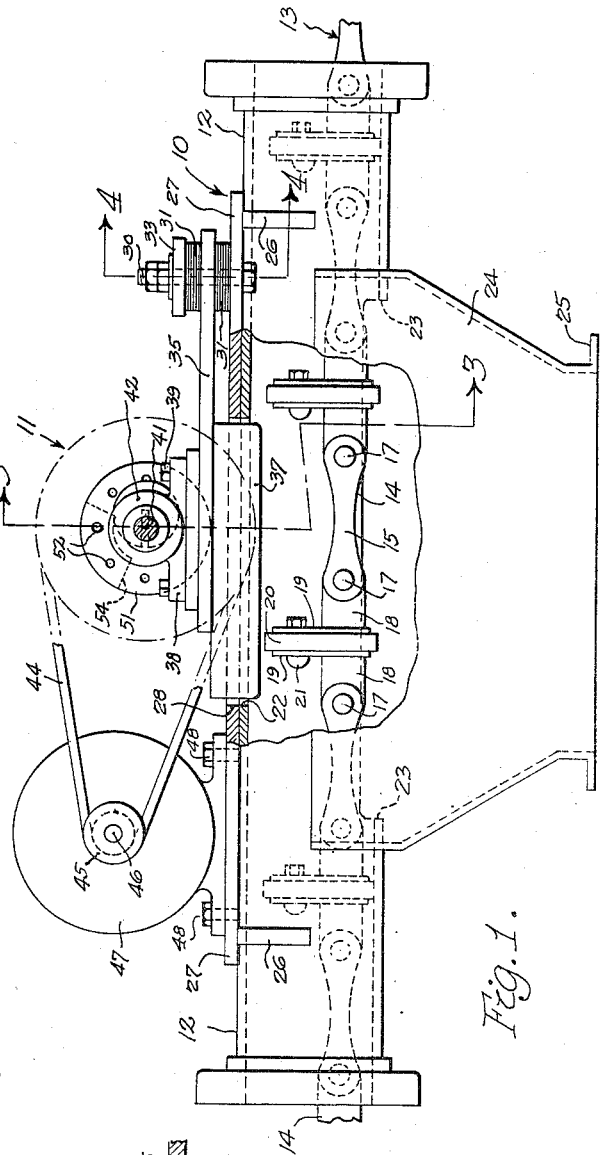
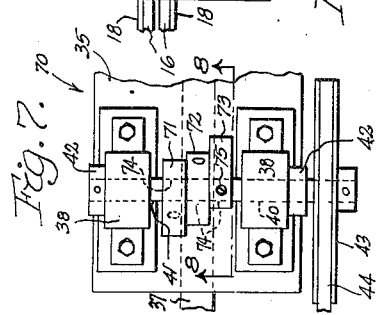
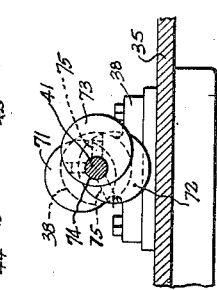
Inventor
Henry W. Hapman
Barthel & Bugbee
Attorneys

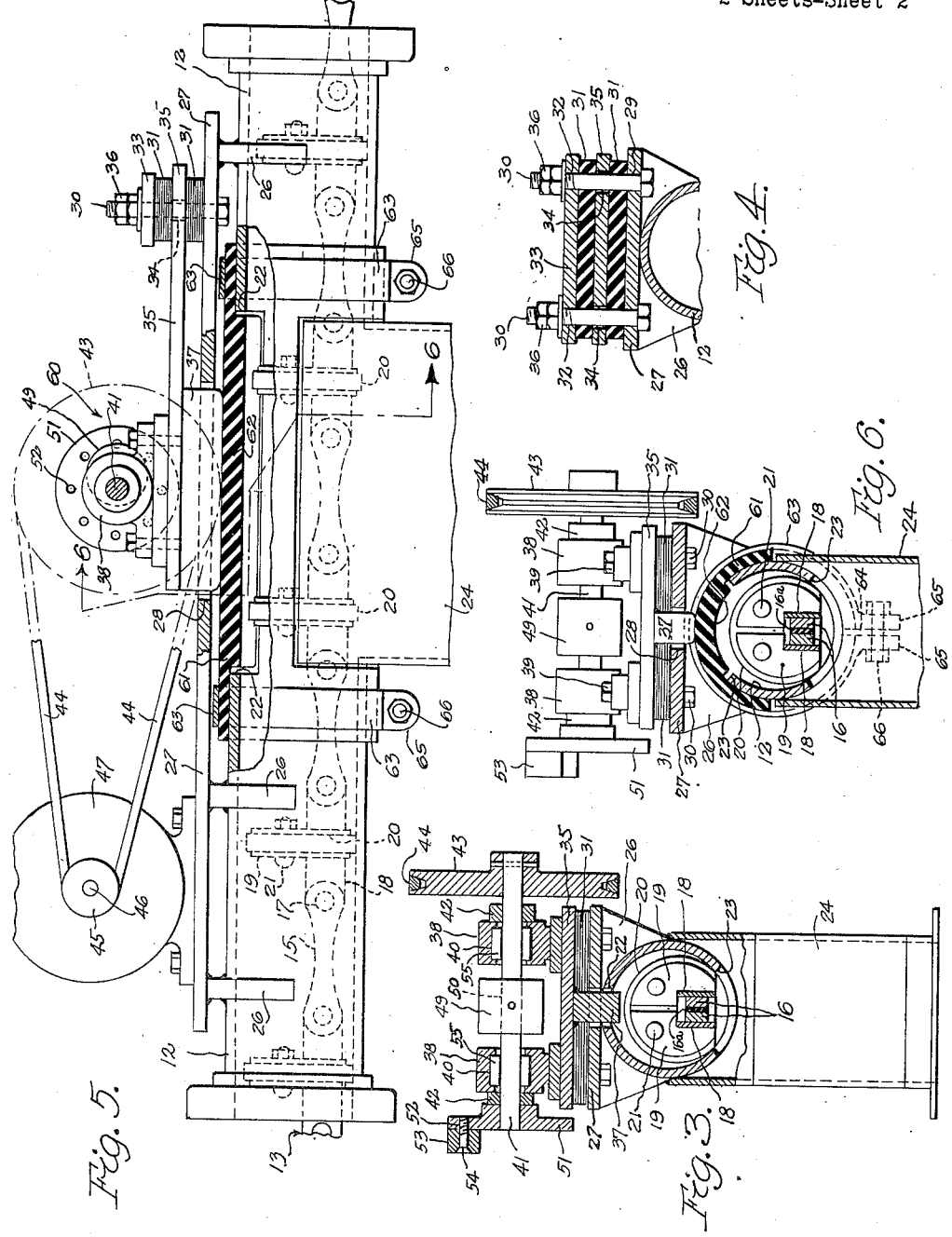

Patented Apr. 3, 1951

2,547,462

UNITED STATES PATENT OFFICE 2,547,462

CONVEYER VIBRATOR

Henry W. Hapman, Detroit, Mich., assignor, by mesne assignments, of sixty per cent to Henry W. Hapman and forty per cent to Hannah J. Hapman, both of Detroit, Mich.

Application January 2, 1948, Serial No. 129

8 Claims. (Cl. 198—229)

This invention relates to conveyors and in particular to devices for removing adhering material from conveyors after the conveyors have discharged the material conveyed.

One object of this invention is to provide a material-removing device for a conveyor having mechanism for vibrating the conveyor after it has discharged the conveyor material, in order to dislodge particles of material which adhere to the flights or other portions of the conveyor after discharge.

Another object is to provide a material-removing device for a conveyor wherein the conveyor vibrating device engages the flights through the intermediate action of a resilient wall which serves to seal off the conveyor conduit from the atmosphere, thereby providing a pressure-tight conveyor system.

Another object is to provide such a material-removing device for a conveyor including an eccentric rotor or flywheel which operates to oscillate the conveyor flight vibrating device so that as the latter moves up and down it intermittently vibrates the flights as they move beneath it, dislodging any conveyed material which is still adhering to the flights.

Another object is to provide such a material-removing device for a conveyor wherein the eccentric rotor is provided with an adjustable counter-rotating eccentric rotor, the position of which may be changed in order to adjust the amount of vibration which is imparted to the support carrying the conveyor vibrating device.

Another object is to provide a material-removing device for a conveyor wherein the eccentric rotor is mounted upon a resiliently-mounted support having a conveyor contacting device attached thereto so that as the eccentric rotor is rotated and acts as a lopsided flywheel, it causes the support to move up and down in the manner of a springboard, thereby causing the contacting device to repeatedly and intermittently vibrate the conveyor flights to remove adhering material.

In the drawings:

Figure 1 is a side elevation, partly broken away in vertical section, of a discharge portion of a flight conveyor, showing a conveyor vibrating device according to a preferred form of the invention;

Figure 2 is a top plan view of the conveyor portion and vibrating device shown in Figure 1;

Figure 3 is a vertical section along the zig-zag line 3—3 in Figure 1, showing the details of the vibrating device.

Figure 4 is an enlarged vertical section along the lines 4—4 in Figure 1, showing details of the resilient mounting for the conveyor vibrating device;

Figure 5 is a side elevation, partly broken away in vertical section, of a discharge portion of a flight conveyor showing a modification wherein the conveyor conduit is sealed off from the vibrating device;

Figure 6 is a fragmentary vertical section along the zig-zag line 6—6 in Figure 5, showing details of the sealing arrangement for the vibrating device;

Figure 7 is a fragmentary top plan view of a modified conveyor vibrating device employing a plurality of relatively adjustable eccentric rotors; and Figure 8 is a vertical section along the line 8—8 in Figure 7.

Heretofore, in conveyor practice it has been a problem to prevent the adherence of conveyed material to the conveyor chain and flights after they pass the discharge station. Many materials are adherent and when the particles thereof reach the conveyor sprockets or bearings, they cause excessive wear and also interfere with the efficient operation of the conveyor.

The present invention solves this problem by applying a vibrating device to the conveyor which knocks the adhering material off the conveyor and prevents it from being carried onward to the sprockets or other mechanism which is likely to be adversely affected by such material. In one form of the invention, the knocker, which is operated as a part of the vibrating device, directly engages the conveyor. In a modification of the invention the knocker engages a resilient wall of the conveyor conduit which in turn engages the conveyor, so that the conveyor conduit is sealed off from the atmosphere and is vibrated by the impact of the knocker acting through the resilient wall.

Direct-acting conveyor vibrator

Referring to the drawings in detail, Figure 1 shows a conveyor unit, generally designated 10, equipped with a preferred form of the conveyor vibrator, generally designated 11, according to the invention. The conveyor unit 10, in turn consists of a conduit 12 through which flight conveyor 13 travels. The flight conveyor 13 is of any suitable type, the details of which form no part of the present invention. The conveyor 13 shown for purposes of illustration in the accompanying drawings is of the type disclosed and claimed in my co-pending application Serial No. 676,546, filed June 13, 1946 for Flight Conveyor. The conveyor 13 consists of an endless conveyor chain 14 having outer and inner links 15 and 16 separated by resilient washers 16a of rubber-like material and pivotally interconnected by pivot pins 17. Secured to the pivot pins 17 are the bent ends 18 of approximately semi-circular clamping plates 19 between which are clamped disc-like flights 20 of rubber or rubber-like material, as by the fastener 21. As stated in my above-mentioned co-pending application, the links 15 and 16 and pivot pins 17 have very loose fits so that the chain can twist longitudinally while passing around bends in the conveyor conduit 12.

The conveyor conduit 12 is cut away to provide elongated top and bottom apertures 22 and 23 respectively. Secured to the conduit 12 and surrounding the elongated aperture 23 is a tapering box-like discharge spout 24 which is flanged at its lower edge 25 for connection to a hopper, bin or other receptacle for receiving the material being conveyed and discharged through the aperture 23. Secured as by welding to the upper surface of the conduit 12 are flat-topped arcuate bottomed brackets 26 (Figure 4). Mounted on the flat topped portions of the brackets 26 is a base plate 27 which serves to support the conveyor vibrator 11. The base plate 27 is provided with an elongated aperture 28 aligned with and of the same size as the elongated aperture 22 in the top of the conduit 12.

The base plate 27 is bored as at 29 to receive bolts 30 (Figure 4) which pass upward through cushions 31 of resilient rubber-like material and through holes 32 in a top plate 33. The bolts 30 also pass through enlarged holes 34 in an oscillating plate 35 which is clamped between the cushions 31 by the bolts 30 and nuts 36. The oscillating plate 35 extends longitudinally along the conduit 12 like a spring board, and on its under side carries an elongated knocker 37 (Figure 1) secured thereto as by welding or by suitable fasteners. The knocker 37 is preferably of a length sufficient to engage two of the flights 20 on the conveyor 13 as they pass beneath the knocker 37 while the latter is being oscillated by the oscillating plate 35. The knocker 37 has sufficient clearance within the apertures 22 and 28 to permit it to move freely up and down.

In order to oscillate or vibrate the knocker 37, a pair of spaced bearing blocks 38 are bolted as at 39 to the upper surface of the plate 35. Journaled in the bores 40 of the bearing blocks 38 is a shaft 41, the latter being prevented from moving endwise by collars 42 pinned or otherwise secured thereto (Figure 2) outside the bearing blocks 38. Secured to one end of the shaft 41 is a pulley 43 which is driven by a belt 44 from a pulley 45 upon the armature shaft 46 of an electric motor 47, the base of which is bolted as at 48 to the base plate 27. Mounted on the shaft 41 between the bearing blocks 38 is an eccentric rotor consisting of a flyweight or flywheel 49 which has a bore 50 drilled away from its geometrical center, the shaft 41 passing through and being secured within the bore 50.

Pinned or otherwise secured to the end of the shaft 41 opposite the pulley 43 is a disc 51 having circumferentially-spaced peripheral holes 52 (Figures 1 and 2). Bolted to the disc 51 as by fasteners 53 threaded into the holes 52 is a sector-shaped counterweight 54. In order to facilitate rotation of the shaft 41, anti-friction bearings 55 (Figure 3) are mounted within the bearing blocks 38.

The modified conveyor vibrator 60 shown in Figures 5 and 6 is generally similar to the vibrator 11 and similar parts are similarly designated. In Figures 5 and 6, however, the base plate 27 is spaced slightly above the upper wall of the conduit 12 so as to provide room for an approximately semi-cylindrical wall member 61 of resilient material such as rubber or synthetic rubber. The wall 61 has a thickened portion 62 extending downward into the aperture 22 so that its inner wall lies adjacent the conveyor flights 20.

The wall 61 at its opposite end is clamped tightly against the upper surface of the conveyor conduit 12 by hoop-like clamping rings 63 which are split as at 64 (Figure 6) and have radially projecting lugs 65 through which clamping bolts 66 pass. By tightening the clamping bolts 66, the opposite ends of the wall 61 may be firmly secured to the conduit 12, so that a pressure-tight seal is effected. In Figures 5 and 6 the knocker 37 does not directly touch the flights 20 but instead contacts the resilient wall 61 and forces it into contact with the flights 20. The conveyor in the modification shown in Figures 5 and 6 is the same as that shown in Figures 1 to 4 inclusive and its parts are similarly designated.

The modified conveyor vibrator generally designated 7, shown in Figures 7 and 8, is generally similar to that shown in the central portion of Figures 1, 2 and 5 and similar parts are similarly designated. In the modification of Figures 7 and 8, however, the disk 51 and counterweight 54 have been omitted. The eccentrically mounted rotor 49 has been replaced by three eccentrically mounted rotors 71, 72 and 73, each of which is provided with an eccentric bore 74 to receive the shaft 41. The rotors 71, 72 and 73 are adjustably secured to the shaft 41 by means of set screws 75. In this manner the rotors may be adjusted relatively to one another until the resultant vibration imparted to the oscillating plate 35 is exactly the amount desired according to the particular conditions of use.

In the operation of the invention, either of the principal form shown in Figures 1 to 4 inclusive or of the modifications shown in Figures 5 and 6, or in Figures 7 and 8, the rotation of the motor shaft 46 and the consequent rotation of the eccentric shaft 41 and eccentric rotors 49 or 71, 72 and 73, imparts an up-and-down oscillation to the resiliently-supported plate 35. This is analogous to the oscillation imparted to a springboard by a swimmer jumping up and down on the end thereof. The amount of the oscillation may be regulated by altering the position of the counterweight 53 relatively to the flywheel 49 so that the eccentricity of the one will counteract that of the other, or will amplify it, as desired. As the plate 35 oscillates up and down, it carries the knocker 37 with it. The latter thus imparts a rapid tapping or hammering to the flights 20 as the conveyor 13 moves them successively beneath the knocker 37. The conveyed material is dumped by gravity through the aperture 23 (Figure 1) into the spout 24, and any particles adhering to the flights 20 or other portions of the conveyor 13 are knocked off by the rapid vibration imparted to it by rapidly oscillating the knocker 37. Thus, the flights 20 and the remainder of the conveyor 13 are completely free from particles of the conveyed material as they move onward to the conveyor sprocket (not shown) and the latter with its accompanying mechanism is thereby relieved of much wear and interference which would otherwise occur.

The operation of the modification shown in Figures 5 and 6 is generally similar to that of the principal form of the invention shown in Figures 1 to 4 inclusive. The knocker 37 in Figure 5, however, in its oscillation similarly oscillates the portion 62 of the wall 61 and forces it into intermittent and rapidly repeated contact with the conveyor flights 20. This action similarly dislodges the material particles from the conveyor 13 and at the same time, a pressure-tight seal is maintained between the conduit 12 and the atmosphere. The modification of Figures 5 and 6, therefore, may be used in pressurized or vacuum systems such as conveying coal or sludge from the bottom portions of vertical standpipes or bins, or conveying fly ash from the firesides or fire pits of boilers which are steaming under pressure.

The operation of the modification shown in Figures 7 and 8 is similar to that of the principal form shown in Figures 1 to 4 inclusive, except that the amplitude of oscillation of the plate 35 is adjusted by loosening the set screws 75 and rotating the rotors 71, 72 and 73 relatively to one another around the shaft 41. The set screws 75 are then tightened and the vibrator 70 is started in operation. If the vibration is insufficient, the eccentric rotors 71, 72 and 73 are adjusted so that they lie more nearly on the same side of the axis of the shaft 41, whereupon their eccentric effects reinforce one another. On the other hand, if the vibration obtained is too vigorous for the existing conditions, one or more of the eccentric rotors 71, 72 or 73 is adjusted so that its eccentric portion lies on the opposite side of the axis of the shaft 41, thereby tending to counteract the eccentric effect of the other rotor or rotors. In this manner the vibration may be adjusted within a range between substantially no vibration whatever and a maximum vibration which is the combined effect of all three rotors 71, 72 and 73 when they are placed side by side with their peripheries in alignment. Under such conditions of maximum vibration the lines of centers extending through the center of each rotor and the center of the shaft 41 will lie in a common plane.

It will be obvious from Figures 1 and 5 that the invention is also applicable to the removal of adhering particles of the conveyed material from a conveyor with metallic flights, such as steel or cast iron, rather than rubber or synthetic rubber flights. Under these circumstances, the apparatus shown in Figure 5 remains unchanged. In order to deaden the noise, the knocker 37 in Figure 1 is preferably made either from elastic deformable material such as rubber or synthetic rubber, or provided with a coating or cushion thereof. The operation, however, remains unchanged.

What I claim is:

1. A vibrator for dislodging conveyed material from a flight conveyor traveling in a conveyor conduit, comprising an oscillatable knocker structure movably mounted adjacent said conduit for motion toward and away from said conveyor, said conveyor conduit having an aperture through a side wall thereof, a resilient wall mounted on said conveyor conduit in closing relationship with said aperture, said knocker structure including a knocker intermittently engageable with said resilient wall, and power-driven oscillating mechanism operatively connected to said knocker structure for oscillating said knocker into and out of engagement with said resilient wall.

2. A vibrator for dislodging conveyed material from a flight conveyor traveling in a conveyor conduit, comprising a base, a movable support movably mounted on said base, a knocker mounted on said support and movable through an aperture in said conveyor conduit, and power-driven support-oscillating mechanism mounted on said support and including a rotary shaft with a flyweight mounted with its center of gravity disposed eccentrically thereof and with its periphery rotating unimpededly in free space, said mechanism being responsive to the pulsating momentum resulting from the rotation of said eccentric flyweight for oscillating said support and moving said knocker into and out of engagement with said conveyor.

3. A vibrator for dislodging conveyed material from a flight conveyor traveling in a conveyor conduit, comprising a base, a movable support movably mounted on said base, a knocker mounted on said support and movable through an aperture in said conveyor conduit, and power-driven support-oscillating mechanism mounted on said support and including a rotary shaft with a flyweight mounted with its center of gravity disposed eccentrically thereof and with its periphery rotating unimpededly in free space, said mechanism being responsive to the pulsating momentum resulting from the rotation of said eccentric flyweight for oscillating said support and moving said knocker into and out of engagement with said conveyor, and also including an adjustable counterweight mounted eccentrically on said shaft and rotatable in unison with said flyweight.

4. A vibrator for dislodging conveyed material from a flight conveyor traveling in a conveyor conduit having an aperture in a side wall thereof, said vibrator comprising a resilient wall mounted on said conveyor conduit in closing relationship with said aperture, a base, a movable support movably mounted on said base, a knocker mounted on said support and movable into and out of engagement with said resilient wall, and power-driven support-oscillating mechanism operatively connected to said support for oscillating said support and moving said knocker to oscillate said resilient wall into and out of engagement with said conveyor.

5. A vibrator for dislodging conveyed material from a flight conveyor traveling in a conveyor conduit having an aperture in a side wall thereof, said vibrator comprising a resilient wall mounted on said conveyor conduit in closing relationship with said aperture, a base, a movable support movably mounted on said base, a knocker mounted on said support and movable into and out of engagement with said resilient wall, and power-driven support-oscillating mechanism operatively connected to said support and including a rotary shaft with a rotor mounted eccentrically thereon for oscillating said support and moving said knocker to oscillate said resilient wall into and out of engagement with said conveyor.

6. A vibrator for dislodging conveyed material from a flight conveyor traveling in a conveyor conduit having an aperture in a side wall thereof, said vibrator comprising a resilient wall mounted on said conveyor conduit in closing relationship with said aperture, a base, a movable support movably mounted on said base, a knocker mounted on said support and movable into and out of engagement with said resilient wall, and power-driven support-oscillating mechanism operatively connected to said support and including a rotary shaft with a rotor mounted eccentrically thereon for oscillating said support and moving said knocker to oscillate said resilient wall into and out of engagement with said conveyor, and also including an adjustable counterweight mounted eccentrically on said shaft and rotatable in unison with said rotor.

7. A vibrator for dislodging conveyed material from a flight conveyor traveling in a conveyor conduit having an aperture in a side wall thereof, said vibrator comprising a resilient wall mounted on said conveyor conduit in closing relationship with said aperture, a base, a resilient mounting secured to said base, a movable support movably mounted on said resilient mounting, a knocker mounted on said support and movable into and out of engagement with said resilient wall, and power-driven support-oscillating mechanism operatively connected to said support for oscillating said support and moving said knocker to oscillate said resilient wall into and out of engagement with said conveyor.

8. A vibrator for dislodging conveyed material from a flight conveyor traveling in a conveyor conduit, comprising a base, a movable support movably mounted on said base, a knocker mounted on said support and movable through an aperture in said conveyor conduit, and power-driven support-oscillating mechanism mounted on said support and including a rotary shaft with a plurality of flyweights mounted with their centers of gravity disclosed eccentrically thereof and with their peripheries rotating unimpededly in free space, said mechanism being responsive to the pulsating momentum resulting from the rotation of said eccentric flyweights for oscillating said support and moving said knocker into and out of engagement with said conveyor.

HENRY W. HAPMAN.

REFERENCES CITED

The following references are of record in the file of this patent:

UNITED STATES PATENTS

| Number | Name | Date |
|---|---|---|
| 1,495,450 | Smith | May 27, 1924 |
| 1,580,178 | Talbot | Apr. 13, 1926 |
| 1,742,843 | Benedict | Jan. 7, 1930 |
| 1,938,402 | Renner | Dec. 5, 1933 |
| 2,418,757 | Collins | Apr. 8, 1947 |

FOREIGN PATENTS

| Number | Country | Date |
|---|---|---|
| 670,379 | Germany | Jan. 18, 1939 |